March 1, 1938.  T. L. FAWICK  2,109,722
BRAKE
Filed April 9, 1934  7 Sheets-Sheet 3
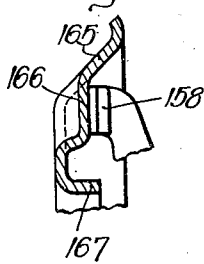
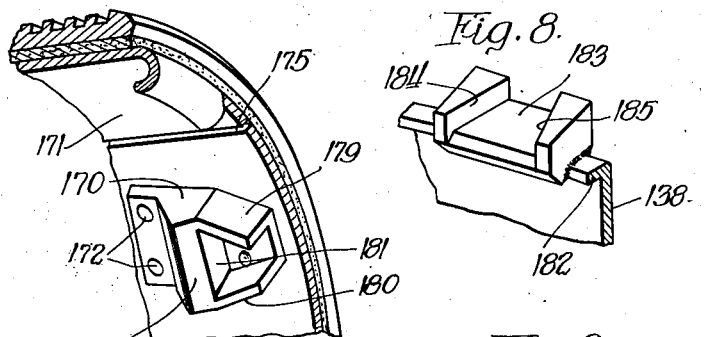
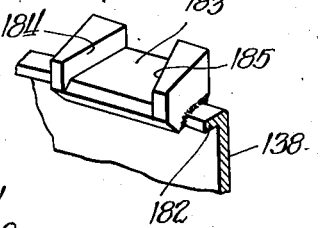
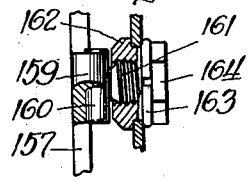
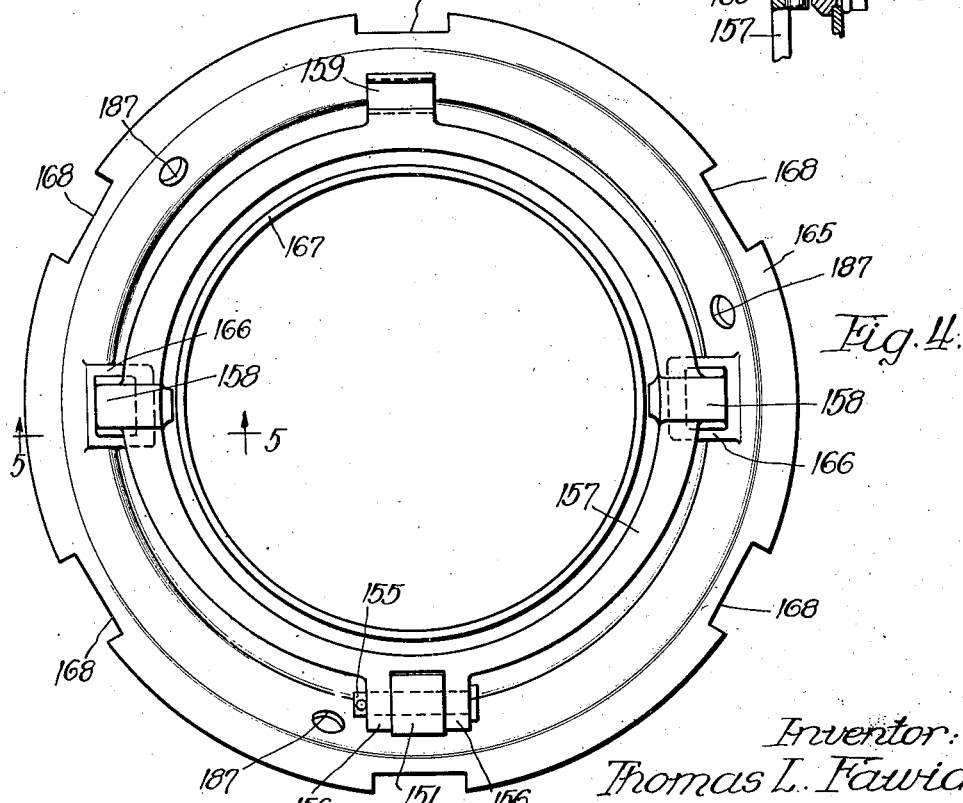
Inventor:
Thomas L. Fawick

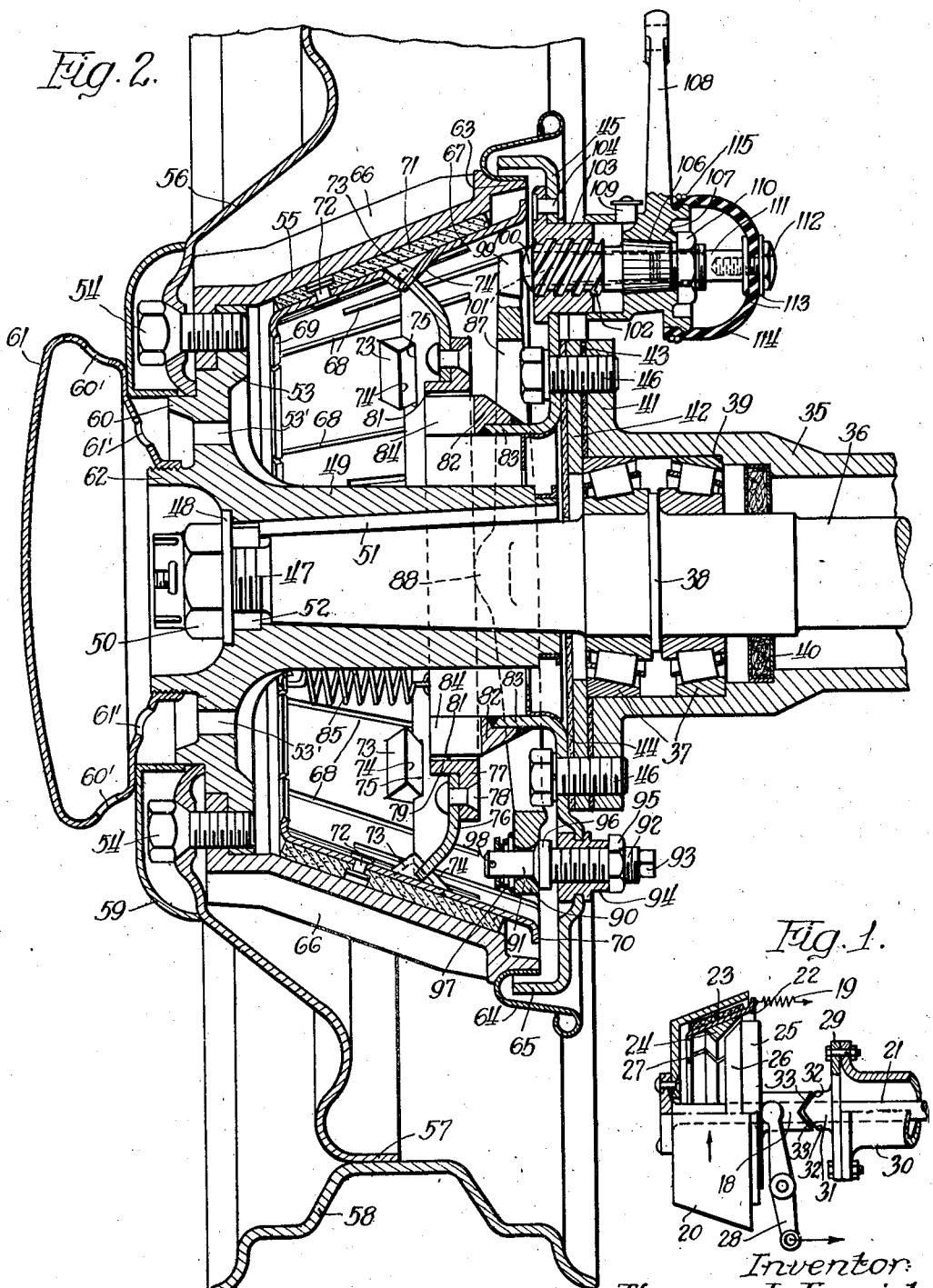

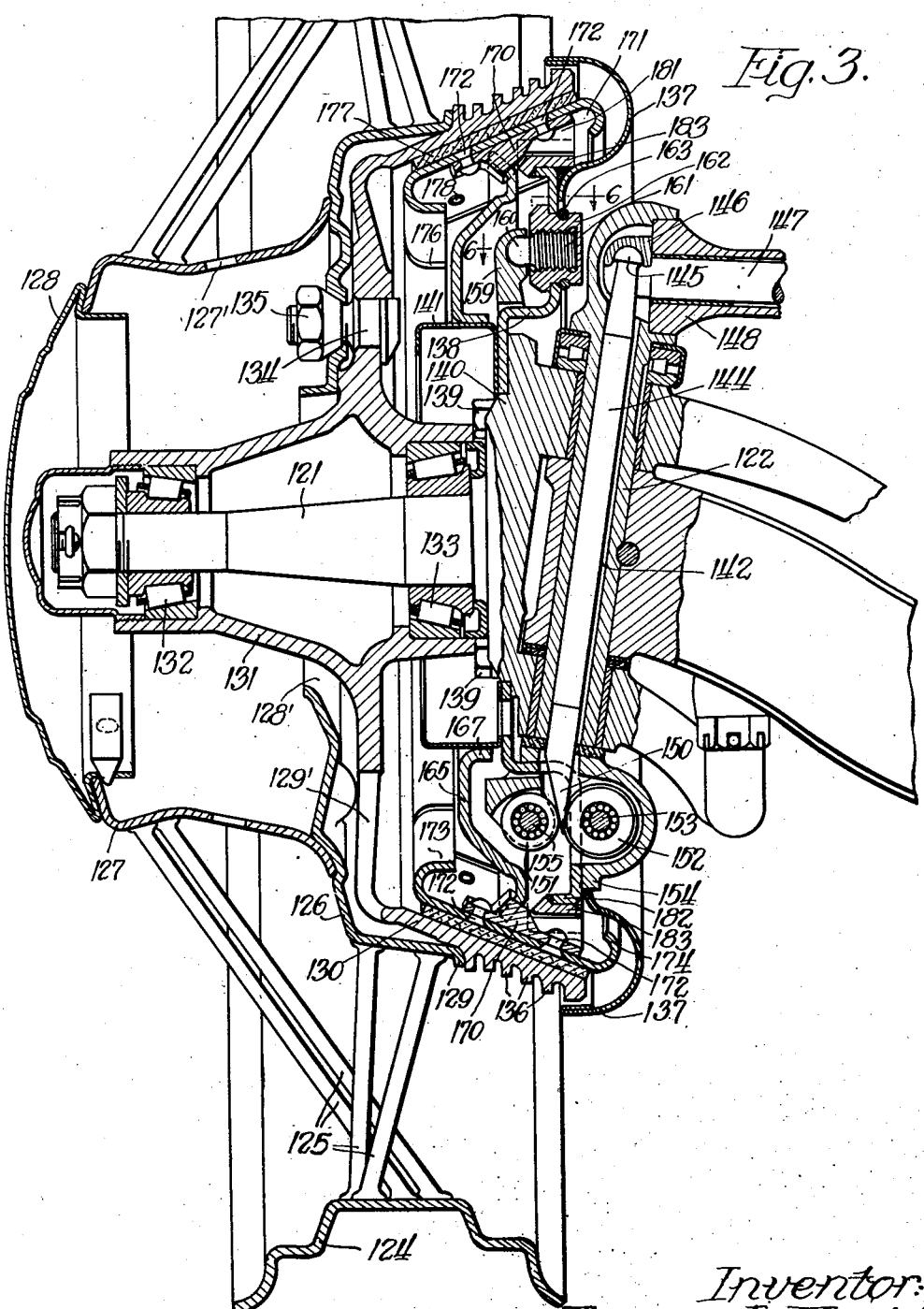

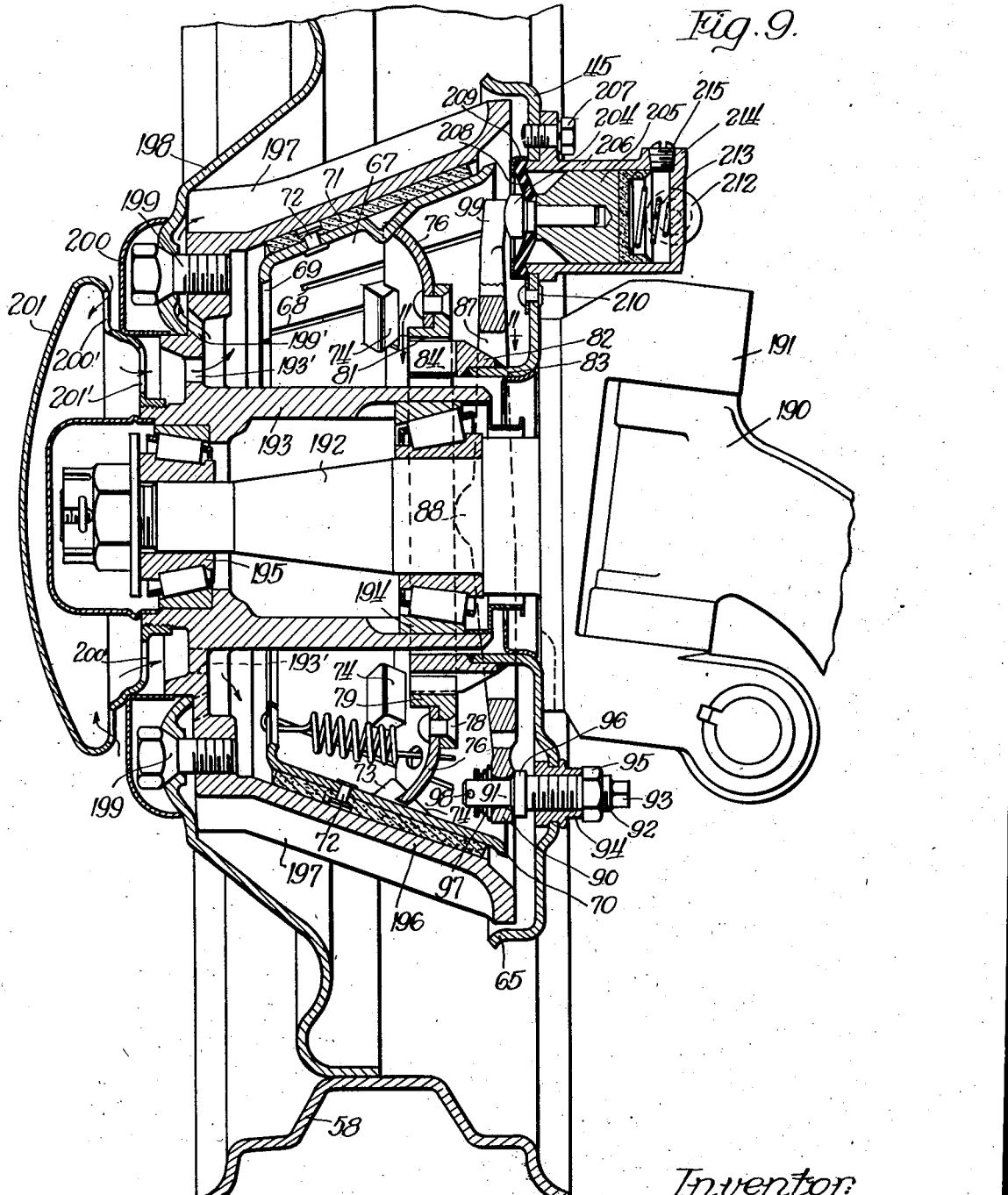

March 1, 1938. T. L. FAWICK 2,109,722
BRAKE
Filed April 9, 1934 7 Sheets-Sheet 5
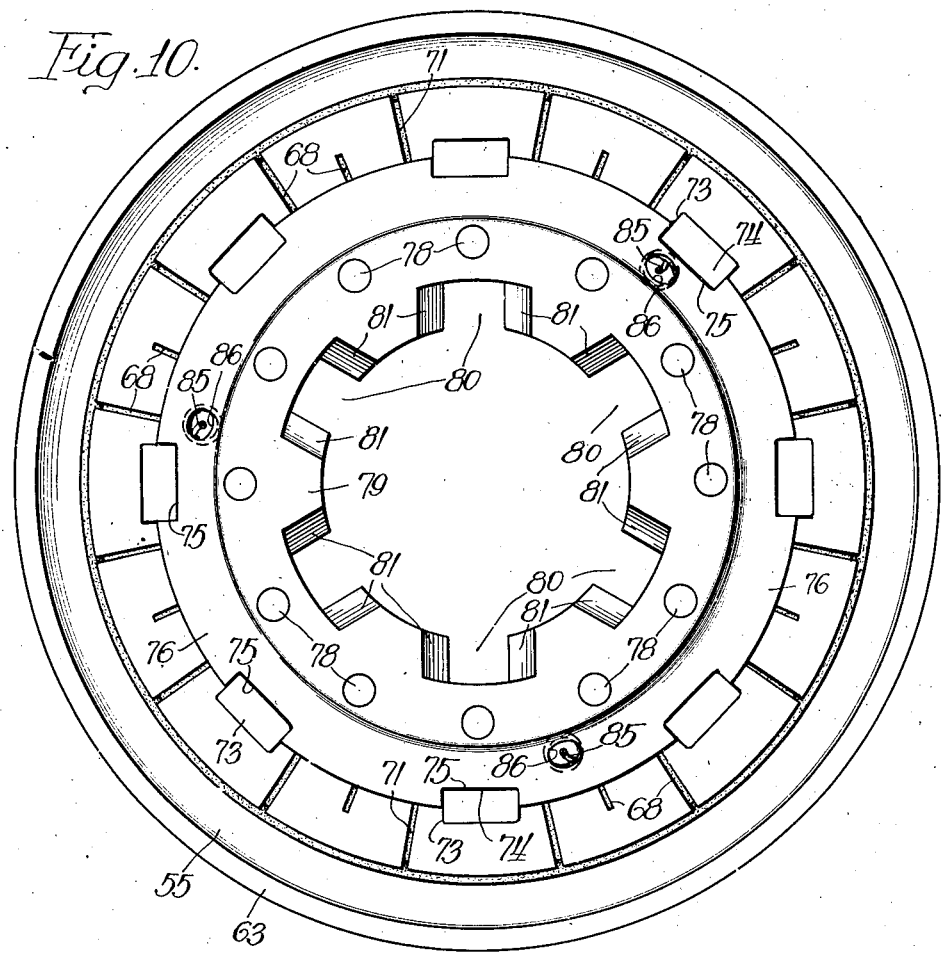
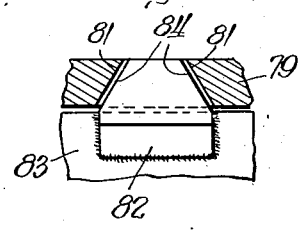
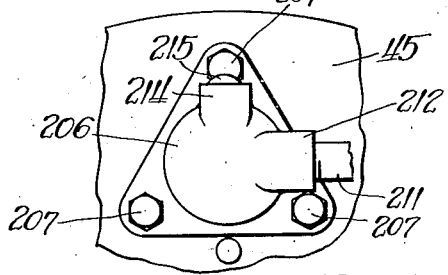
Inventor:
Thomas L. Fawick
By Brown Jackson Boettcher - Dienner
Attys.

Inventor:
Thomas L. Fawick
By Mason Jackson Bonteous Brenner
Attys.

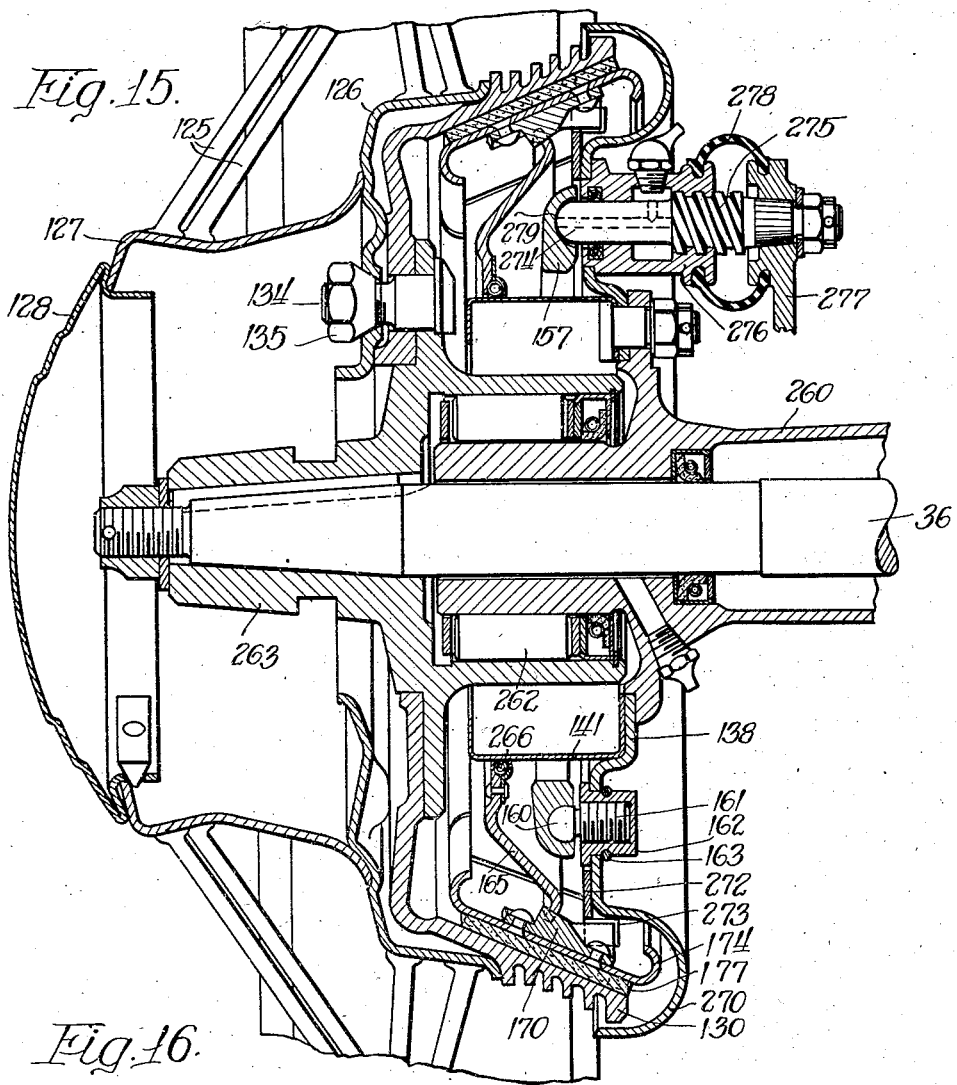
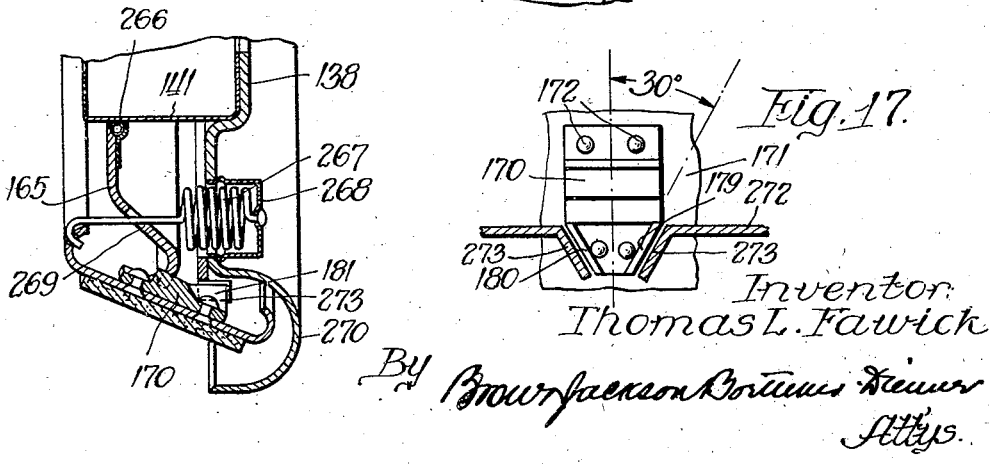

Patented Mar. 1, 1938

2,109,722

UNITED STATES PATENT OFFICE 2,109,722

BRAKE

Thomas L. Fawick, Akron, Ohio

Application April 9, 1934, Serial No. 719,678

51 Claims. (Cl. 188—140)

This invention relates to brakes, and more particularly to brakes for use on vehicle road wheels, such as automobile, rail car and aeroplane wheels, although its use is not intended to be thus limited.

The primary object of the present invention is to provide a light weight, simplified type of brake which is more powerful than brakes heretofore provided, and which, although compact in design, has a relatively large brake surface disposed within a small space. The tendency in design of vehicle road wheels at the present time is toward small diameter wheels of simplified form, and consequently the compactness of design of braking means therefor, while retaining positiveness of action and a relatively large braking area, has come to be a major problem. Also, high speed operation of such vehicles has presented a demand for a powerful and effective brake which is incapable of locking when operated, and which may be readily adjustable in use. Also, by reason of the design of such wheels, the dissipation of the heat generated by the friction between the braking surfaces during high speed operation must be considered in order to increase the efficiency and life of the brake.

The brake provided in the present invention is relatively inexpensive to manufacture, and by reason of its compactness and simplicity of design, the application of such a brake structure to a vehicle road wheel is facilitated. The working parts of the present brake structure are fully enclosed, but the actuator and the adjusting means are readily accessible without requiring removal of the vehicle wheel. The parts employed are for the most part disposed coaxially with the wheel, which facilitates their construction, manufacture and assembly.

The two major types of braking systems now employed in automobiles and the like are the mechanical type employing leverage connections actuated by depression of a pedal or the like for moving the braking surfaces at each of the wheels into engagement, and the hydraulic type in which depression of the pedal operates a pressure piston with suitable pressure conduits leading through pressure chambers or the like adjacent each road wheel, the increase in pressure actuating a pressure plunger to cause engagement of the braking surfaces. Vacuum systems employing the same principle have also been employed. The present invention contemplates the provision of a brake structure which may be either mechanically or hydraulically actuated, having interchangeable actuating means or a combination actuator which may be utilized with either type of system without change in structure. Pneumatic operation may also be secured. The actuator of the present invention is so constructed that emergency or parking brake actuating means may be readily connected into the braking system and operated independently.

One feature of the present invention of distinct advantage is the use of a novel conical brake shoe and brake drum. The conical shoe is capable of expanding and contracting, whereby a smooth operating, non-locking type of brake action is provided. The brakes of my invention eliminate chattering or eccentric grabbing and also eliminate squeaking of the brakes when applied.

The present brake structure is so constructed that the cone brake cannot wedge into the brake drum, firstly, due to the expansion and contraction characteristics of the cone, and secondly, due to the means and mode of action by which the braking pressure is applied to the cone to move it into engagement with the drum. I preferably provide for applying this pressure at a plurality of points about the periphery of the cone, whereby substantially uniform pressure about the cone periphery produces substantially uniform expansion and movement of the cone into engagement with the drum. Also, by this uniformity of pressure application, little or no distortion of the braking surfaces occurs, and consequently less wear on the brake surfaces is effected. Distortion effects are further reduced by the rigidity of the shoes, the small diameter of the brake cone and drum due to its compactness and the effective support of the operating parts, all of which tends to increase the life and wearing qualities of the brakes.

Another feature of the present invention is the engagement between the pressure plate and the conical shoe, which is at such an angle that no locking of the shoe within the brake drum can occur, regardless of the angle of the friction braking surface carried by the shoe.

The invention produces another marked advantage over prior brake structures of which I am aware, in that the multiplication of pressure is increased to provide a powerful braking action by a relatively small application of pressure to the brake operating pedal or the like. I believe it is broadly new to provide a self energizing conical brake.

A further object of the present invention is to provide a brake wherein adjustment thereof is facilitated by having an exposed adjusting member projecting outwardly by the enclosing housing for the brake structure, which adjusting member may be engaged by a suitable tool to adjust each brake individually.

Another feature presented by the invention disclosed herein is the use of an interchangeable actuating means, which may be either hydraulically or mechanically operated to actuate the brake. When hydraulic actuation is employed, the operating piston and cylinder are accessible without requiring dismounting of the wheel or removal of any of the brake structure. If mechanically actuated, the operating member therefor is disposed outside of and freely accessible exteriorly of the wheel and brake. The actuator, whether of the hydraulic or mechanical type, may also have incorporated therein an additional mechanical actuator for parking or emergency brakes, working through the hydraulic or mechanical unit, and completely enclosed, although freely accessible.

I preferably employ what is termed "servo" action in applying the present cone brakes. The conical brake shoe is provided with camming surfaces, or is actuated by a pressure plate having camming surfaces, which surfaces, upon the engagement of the friction surface with the rotating brake drum, engage stationary corresponding camming surfaces to urge the conical brake surface into tighter engagement with the drum, to produce a smooth and effective braking action of greatly increased efficiency and braking power. In the present invention, the "servo" acts through the self releasing angle surfaces of the cone or pressure plate cam members, and hence, no matter how great a servo action is produced, no locking of the brake shoe within the drum can occur. Further, I preferably make the camming surfaces axially symmetrical, so that the servo action is effective upon the release angle surfaces of the cam members regardless of the direction of rotation of the wheel and drum.

Another object of the invention is to produce an economical, substantially standardized type of brake, in order to take advantage of the saving effected by quantity production, and I preferably form the major parts of the brake structure from die-pressed sheet metal or the like. This provides for uniformity of construction, eliminates certain machining and finishing operations, and reduces the number of forgings or machined parts which may be provided.

A further feature of the invention is the incorporation of a novel principle of cooling and ventilating the brakes, in order to keep the heat generated by the frictional engagement between the braking surfaces away from the tires. This is accomplished by employing heat dissipating surfaces on the brake drum in order to remove the heat as quickly as possible from these surfaces, and also to secure rapid movement of air past the braking surfaces, interiorly and exteriorly of the drum, to cool the same, while maintaining a substantially enclosed type of brake structure.

A still further advantage of the present invention is the facility with which servicing of the brake structure can be accomplished. The cone and braking surface thereof may be readily replaced, and in practice, it will be found more economical to replace the entire cone and brake surface than to reface the brake surface itself. By virtue of the organization of structure of the brakes, this removal of the cone is easily effected, and consequently little time is required for this purpose. Also, the accessibility of the actuating means, whether it be hydraulic or mechanical, will allow simple and quick servicing and adjustment of the actuator, and the externally disposed adjusting means for the brake thrust plate provides for ease in adjustment of the brake on the individual road wheels of the vehicle.

Other objects and advantages of the present invention will appear more fully from the following detailed description, which, taken in conjunction with the accompanying drawings, will disclose, to those skilled in the art, the particular construction and operation of a preferred embodiment of my invention.

In the drawings:

Figure 1 is a diagrammatic showing, partly in section, of a braking system employing the principles of the present invention;

Figure 2 is a vertical sectional view of a vehicle wheel provided with the brake structure of the present invention;

Figure 3 is a vertical sectional view of a modified type of brake structure adapted for use on the front wheel of a vehicle;

Figure 4 is an end elevational view of the brake actuator and pressure plate shown in Figure 3;

Figure 5 is a detail sectional view taken substantially on the line 5—5 of Figure 4;

Figure 6 is a partial sectional view of the adjusting member employed in the embodiment shown in Figure 3, taken substantially on the line 6—6 of Figure 3;

Figure 7 is a partial perspective view of the inner surface of the brake shoe, showing in detail one of the servo cams mounted thereon;

Figure 8 is a detail perspective view of the corresponding servo cam mounted on the anchor plate;

Figure 9 is a vertical sectional view of a brake structure employing hydraulic actuating means;

Figure 10 is an end elevational view of the brake actuating mechanism shown in Figure 9;

Figure 11 is a sectional view taken substantially on the line 11—11 of Figure 9, showing the servo cam surfaces;

Figure 12 is an end elevational view of the hydraulic actuator shown in Figure 9;

Figure 15 is a vertical section through a rear wheel generally corresponding to the front wheel shown in Figure 3;

Figure 16 is a fragmentary section showing the position of the retractor springs; and Figure 17 is a fragmentary view showing the position of the servo cam and plate.

Figure 14:
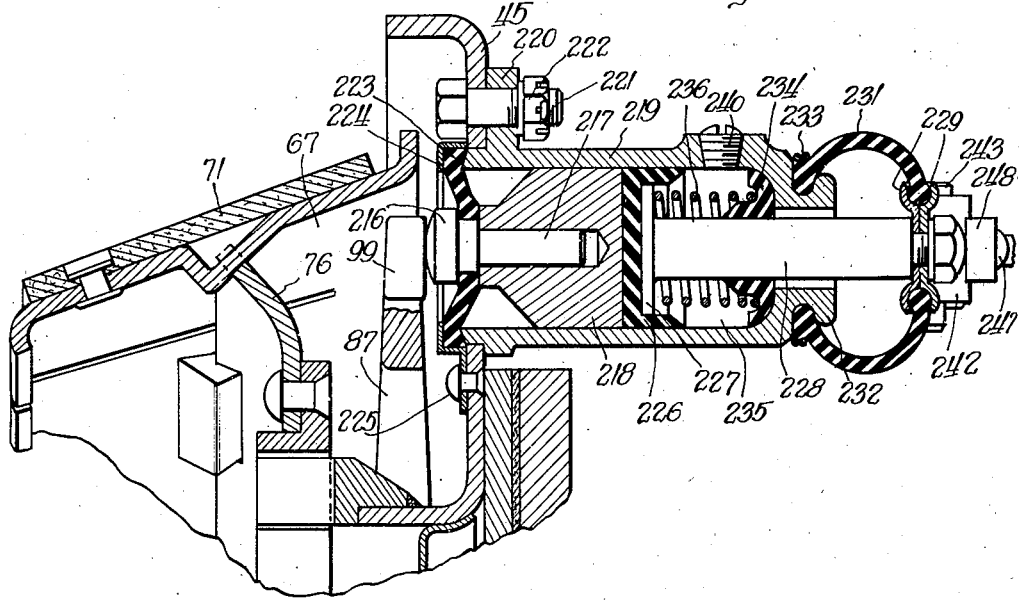
Figure 14 is a cross-sectional view of the actuating member shown in Figure 13, as applied to a braking structure.

Referring now to the diagrammatic showing of the braking system in Figure 1, the reference numeral 20 indicates the rotating brake drum carried by the vehicle wheels and secured to the axle or shaft 21. Disposed within the drum 20 is an expansible conical brake member 22, provided with a friction braking surface at 23, and having on its inner surface a split annular member 24 adapted to be engaged by a pressure transmitting member 25 having a conical surface 26 corresponding to one surface of the member 24. As indicated at 27, the conical brake member 22 is slotted from opposite directions to permit expansion and contraction thereof. The pressure transmitting member 25 which is cut into sections to permit expansion and contraction, is adapted to be shifted inwardly on its supporting collar 18 by means of any suitable brake actuating mechanism, as diagrammatically indicated at 28. A thrust collar or stationary housing member 29, secured to the axle housing 30, is provided with a hub or boss 31 having angular camming surfaces 32. The surfaces 32 are adapted to be engaged by corresponding surfaces 33 carried by the collar 18 of the pressure member 25. Upon engagement of the pressure transmitting member 25 with the ring 24 of the conical brake member 22, the member 22 is forced inwardly to engage the friction surface 23 with the inner braking surface of the drum 20.

However, as the surface 23 engages the inner surface of the drum 20, there is a tendency on the part of the member 22, as well as the pressure transmitting member 25, to rotate in the direction of rotation of the drum 20. This causes one of the camming surface 33 to engage the corresponding cam surface 32, which tends to thrust the member 25 inwardly to a greater extent, thus tending to increase the action of the brake. This is what I term "servo" action. Inasmuch as the cam surfaces 32 and 33 which are engaged are self releasing angle surfaces, and since the cone 25 and ring 24 have a self releasing angle, the cone in shoe 22 cannot become locked or bound in the coned drum 20. The contractibility of the shoe 22 and the self releasing angle of the surfaces of members 24, 25, as well as surfaces 32, 33, will permit automatic release of the entire system under the pull of release spring 19.

Considering now the rear wheel brake structure shown in Figure 2, I have disclosed an axle housing indicated at 35, which preferably encloses the major portion of an axle 36, the axle 36 being mounted within the housing 35 by a pair of roller bearing members 37, positioned with respect to the axle by means of a collar 38 carried by the axle, and also held in position by engagement with the shoulder 39 formed in the axle housing. A lubricant retaining member 40 is disposed inwardly of the bearing member 37 to prevent loss of lubricant along the shaft surface.

The housing 35 is provided with a radially flanged portion 41, which flanged portion 41 has secured thereto a bearing retaining member 42, there being a gasket 43 interposed therebetween, which member 42 is of less internal diameter than the recess in the axle housing which contains the bearing member 37, and thus serves to retain the bearing member against outward displacement axially of the shaft 36.

A suitable washer member 44 is disposed on the outer surface of the member 42, and an enclosing housing and anchoring or brake plate 45, preferably stamped or pressed from sheet metal or the like, is secured to the axle housing by means of the cap screws 46, which screws are threaded through the members 44, 42, and the flange portion 41 of the housing 35, securing the member 45 in positive fixed position with respect to the axle housing.

At its outer end, the shaft 36 is provided with a threaded stud portion 47, which is adapted to receive a washer member 48 carried by the hub 49 of the wheel, and a castellated locking nut 50 is secured to the stud portion 47 of the shaft to hold the hub 49 in position. A key or spline member 51 is also held in position within the shoulder 52 and a keyway formed in the hub 49 to lock the hub in non-rotative position with respect to the axle 36.

The hub 49 is provided with an outwardly extending flange portion 53, which is provided with a plurality of threaded openings adjacent its outer periphery adapted to receive cap screws 54 securing the wheel disc in position upon the hub 49. The brake drum 55 is secured upon the hub 49 by rivets holding the overlapping flanges of the two parts firmly in position. The wheel disc 56 is of known type, and is provided with a cylindrically flanged portion 57 upon which is secured the tire receiving rim 58 of the wheel. A suitable cover plate, in the form of an annular flanged ring member 59, encloses the cap screws 54 and engages at its inner end upon a shoulder 60 formed on the hub 49. This closure member 59 is held in position by the hub cap 61 which is threaded at its inner end over an extending portion 62 of the hub member 49 to secure the hub cap and closure member in position.

Considering now in detail the drum 55, this drum is provided at its outwardly flared end, with a shoulder portion 63 adapted to receive a substantially U-shaped closure member 64, preferably stamped from sheet metal or the like, which cooperates with the cylindrically flanged portion 65 of the closure plate member 45 to provide a substantially enclosed housing for the brake structure. The drum 55 is also provided, about its conical surface, with a plurality of spaced substantially radially extending ribs 66, which ribs are for the purpose of dissipating the heat generated on the inner brake surface of the drum 55, and which are also effective to secure movement of air axially along the drum surface and radially outwardly therefrom to provide for cooling of this member, thus preventing the heat generated by operation of the brake from effecting the tires carried on the rim member 58.

The hub cap 61 is provided with spaced openings 60' and 61', as shown. The openings 60' may be provided with baffle means or the like for forcing air into the interior of the hub cap upon rotation of the wheel. Openings 53' are formed in the flange portion 53 of the hub 49, providing for passage of air into the interior of the brake drum. This air is circulated past the inner surface of the drum 55, and passes outwardly through the annular opening between the anchor plate 45 and the dust cap member 64. The ribs or fins 66 may be slightly helical, if desired, to provide for moving air more efficiently past the outer surface of the drum 55, in order to dissipate heat more readily therefrom.

Referring now in detail to the brake structure disposed within the housing formed by the drum 55, the closure member 64, and the end plate 45, this structure includes the conical brake shoe member 67 which is preferably formed from a sheet metal stamping, and which is provided with a plurality of slots indicated at 68 providing for expansion and contraction of this member. Preferably the slots 68 are alternated, the alternate slots opening from the opposite edges 69 and 70 of the shoe member 67 and extending for substantially three-fourths of the lateral extent of the shoe. This distance is optional, but is intended to be great enough to secure expansibility of the conical shoes. The shoe member 67 is adapted to carry, upon its outer surface, the friction or braking lining 71 of the usual well-known construction, which is secured to the shoe 67 by means of a plurality of rivets 72, in the usual manner. The friction surface 71, formed of fiber, asbestos, or any of the usual brake lining materials, is slotted to correspond with the shoe member 67. This is optional. The lining should not interfere with expanding and contracting of the shoe.

The angle of the conical shoe and of the conical drum is approximately 22°, measured from the circular axis of the wheel. This angle may be varied, as it is not critical. The angle should be small enough to obtain a good servo action, as later explained, but should be large enough to get fairly rapid application of the brake.

The shoe member 67 is provided, substantially midway of its lateral extent, with a plurality of pressed up integral lugs 73, which extend inwardly from its inner surface, and which are provided with angular surfaces 74 which are adapted to be engaged within notches 75 cut into the periphery of a substantially bell-shaped pressure transmitting plate 76. The notches 75 loosely enclose the defining edges of the lug members 73, the lower or inner defining edges of the notches 75 engaging the angled surfaces 74. Such notching is not essential and may be dispensed with. The angle between the surfaces 74 of the lugs 73 and the axis of the axle 36 is preferably about 45°. This angle may be varied but it must be self-releasing, i. e., the angle must be great enough that when pressure on plate 76 is released the same will not bind or lock on the inclined surfaces 74 of the lugs 73. The shoe 67 tends to be expanded outwardly into engagement with the drum 55, by reason of the radial component of force exerted by the edges 75 of the notches when the plate is axially moved toward the outer end of the axle. Normally the cone and its friction surface are out of contact with the inner wall of the drum 55 by a space just great enough to avoid rubbing engagement. The first motion of the plate 76 tends to shift the shoe axially into engagement with the drum. The pressure applying plate 76 is secured by means of rivets 78 to the flange 77 of a collar member 79, which is concentric with the shaft 36.

Considering now Figures 10 and 11, it will be seen that the collar member 79 is provided with a plurality of cut-away portions 80 having converging side walls 81—81 forming cam surfaces which converge toward the inner end of the conical shoe 67.

Extending into each of the openings 80 is a servo cam member 82, which is secured as by welding to the inner cylindrically flanged portion 83 of the closure or anchor plate 45. The cam member 82 is provided with correspondingly converging cam surfaces 84, as shown in Figure 11, which are adapted to be engaged by the cam surfaces 81 when the brake is so engaged that the shoe 67 tends to rotate in the direction of movement of the wheel. The effective angle which these cam surfaces 81—84 make with a line extending parallel to the axis of the wheel is approximately 30°. This angle is not critical but it should be so small as to be invariably self-releasing and large enough to give the desired servo action. Instead of a wedge-shaped cam 82 a roller or anti-friction means may be employed. Because of the angularity between the cam surface 81 and the cam surface 84, the pressure transmitting member 76 is adapted to be urged toward the outer end of the axle 36, tending to force the conical shoe member 67 inwardly into the brake drum 55, and consequently increasing the braking action. Retracting springs 85 (Figure 16) are provided for retracting the shoe from the drum when the pressure on plate 76 is released. Due to the fact that the servo camming engagement is exerted through self-releasing angle surfaces of the cam members 82 and the converging side walls 81 of the openings 80, the shoe 67 is rotated and moved outwardly away from the drum 55 in applying the brake, and a reverse motion takes place upon releasing the brake.

The organization of the parts and the relations of the angles is important. First, the inherent resiliency of the cone tends to cause it always to hold itself in a definite position and mean diameter or size, but permits it to be expanded into engagement or fuller engagement with the brake drum in applying the braking pressure. When the plate 76 is first moved to apply the brake shoe to the drum the whole cone 67 is moved axially to take up the few thousandths of an inch by which the shoe and drum are out of contact. Due to the steepness of the angle on the lugs 73 the first movement of the plate 76 tends to carry the cone into contact with the drum at some point. As soon as such contact is made the cone now offers some resistance to further axial movement. Also, if the drum 55 is rotating, the drum tends to carry the cone around angularly with it. This brings surfaces 81—84 into contact. But the contact at 81—84 is at such an angle as not to cause independent advance axially of the cone and plate, for the angle at 81—84 is not great enough to overcome friction at these surfaces. It requires further pressure by the external actuating means to force plate 76 axially to the left as shown in Figure 2. Such further pressure causes motion, which is made easier because of said angular surfaces 81—84, for the movement is as it were down the incline of the angle at 81—84. This further motion meets resistance in forcing the cone further into the drum. The pressure applied on the plate 76 tends, through the angle of the lugs 73, to expand the cone. If one part of the cone engages ahead of another part the plate 76 immediately tends to equalize the pressure by climbing the inclined surfaces of the lugs where pressure is least. Even if the angle of the cone and of the drum were not exactly equal, the pressure applied centrally by plate 76 and lugs 73 would force conformity.

The release of pressure applied externally releases the brake, because none of the parts can sustain themselves under pressure. The cone is resiliently contractible and cannot hold itself under pressure in the cone-shaped drum, no matter how tightly it may have been pressed by the plate 76, for as soon as external pressure on the plate 76 is released, the resiliency of the cone 67 reacts through the inclined surfaces of lugs 73 and forces the plate 76 back to the right, automatically relieving the radial pressure between these parts. The angle at 81—84 is such as not to be capable of resisting the movement to the right (Figure 2) of plate 76. Thus the whole pressure system collapses and the retracting spring moves the cone and plate to the right and slightly angularly backward to provide the running clearance between the shoe and the drum.

I am aware that this conversion of axial pressure into radial expansion can be effected without the necessity for producing any conicity of the shoe and drum. That is to say, the principle is equally applicable to a cylindrical brake or to a plate brake or disc brake, but the cone brake employs both the axial component as well as the radial component on the same surfaces. Conceivably, within my invention two separate surfaces, i. e., a radially engageable surface as a cylinder and an axially engageable surface as a plate or ring, may be employed in lieu of a cone, but the principle is the same. Either the cylinder or the plate might be made to predominate. The cone herein shown is predominantly a cylinder with a subsidiary axial bearing or plate surface, in effect. This is to make clear that my invention is not to be limited to the specific forms which I have shown. I have disclosed a new principle and disclosed means to employ it advantageously.

With the angles as above indicated the increase in braking action effected by the servo mechanism is approximately 100%. The assistance of the servo action may be controlled by the angularity of the surfaces 81—84, within limits. The angle of the cone and the angle of the servo mechanism are related. Also, the assistance of the servo mechanism, if the angle remains the same, may be controlled by the radial distance from the axis of the brake at which it is disposed.

The retracting action is effected by a plurality of retracting springs 85, which are engaged with the inner edge 69 of the slotted cone 67, and at their outer ends are adapted to engage with the stationary closure plate 45. The springs extend through openings 86 formed in the pressure transmitting plate 76, so that no spring tension is exerted upon the plate 76. However, the springs tend to draw the shoe 67 axially away from the drum and against the servo cam, thereby disengaging the braking surfaces.

The cone, instead of being a unitary slotted stamping divided by slotting into segments, may consist of a plurality of separate pieces held in proper alignment and relation. Preferably in such construction separate spring means is provided for contracting the cam.

As pointed out, the cam members 82, as shown in Figure 11, are welded securely to the collar 83 at both the outer edge of the collar and about the outer periphery thereof, and are of a thickness substantially equal to the depth of the openings 80 formed in the member 79. This construction is optional. Instead of a wedge shaped cam 82 having sliding engagement, a roller having rolling engagement with the inclined surfaces 81—81 may be employed. It is to be noted that the camming surfaces 84 of the members 82, or their equivalents, are formed symmetrical with respect to the axis of the member and, also it will be noted that the camming surfaces 81 of the member 79 are symmetrical about the same axis. This provides equal effectiveness in going forward or backward. This feature is optional.

The actuating means for the pressure transmitting plate 76 and the member 79 carrying the servo cam surfaces comprises a lever 87 in the shape of a ring. It is provided with integrally formed bearing or boss portions 88 engaging the collar 79 at diametrically opposed points on both sides of the axle 36. The member 87 is provided with a lower pivot portion indicated at 90 which is provided with an opening adapted to be engaged over the stud portion 91 of an adjusting screw 92. The adjusting member 92 is provided with a polygonally shaped end portion 93 adapted to be engaged by a wrench for threading the member 92 inwardly or outwardly with respect to the bushing 94 by which it is secured in the closure plate member 45. A locking nut 95 is provided for locking the adjusting member. The member 92 is provided with a shoulder 96 which forms a bearing abutment for the pivoted end 90 of the member 87. A compression spring 97 is mounted on the stud 91 and bears against the outer surface of the portion 90 of the member 87. The pivot portion 90 is prevented from displacement with respect to the stud 91 by a locking pin 98 extending normally through the stud 91, which retains the spring in position.

At its upper end the member 87 is provided with an enlarged bearing portion 99 adapted to be engaged by the head 100 of a plunger member 101 carried within and freely slidable with respect to a screw member 102. Upon inward movement of the head 100, the bearing portion 99 of the member 87 is moved inwardly, the member 87 pivoting about the stud 91, and consequently the bearing bosses 88 engage against the outer periphery of the collar member 79 to force the pressure plate 76 inwardly. Inward movement of the pressure plate 76 results in application of the shoe 67 to the drum 55, as above described, and consequent engagement of the braking surfaces for stopping rotation of the wheel.

The screw member 102 is carried within an internally threaded boss member 103 secured by suitable rivets 104 to the closure plate member 45. The screw member 102 is provided with a tapered serrated shank portion 106 adapted to receive the hub 107 of a lever member 108, which is connected through a suitable power transmitting mechanism to the brake pedal or other brake operating means. A lubricant nipple 109 is carried by the collar 107, and provides for admission of lubricant to the screw portion 102 in order to facilitate its movement with respect to the bushing 103. The member 108 is securely and non-rotatably secured upon the tapered serrated portion 106 of the screw member 102 by means of a nut 110 threaded into the outwardly extending end of the tubular member 102.

The member 102 is provided with an axially extending central opening, which receives the plunger 101 and which is also adapted to receive a second plunger or stud member 111 entering into the outer end of the shaft. The stud member 111 is suitably secured, by means of the screw 112 and a pair of washers 113, to a flexible dustproof cap member 114, of rubber or the like, secured over a grooved outwardly flanged portion of the collar 107, the cap member 114 being held in position by means of spring 115. The head end of the screw 112 is adapted to be engaged by the end of any suitable lever or bell crank operated by either an emergency or parking brake for compressing the member 114 and moving the stud 111 inwardly to engage the inner end of the plunger 101. Thus, actuation of the emergency or parking brake will result in movement of the head 100 inwardly to pivot the member 87 about the stud 91 to actuate the brake. Also, mechanical operation of the lever 108 by the brake pedal will result in screwing the threaded member 102 inwardly with respect to the bushing 103, to move the head 100 inwardly to effect actuation of the brake for service purposes.

The brake structure shown in Figure 2 is mechanical in operation, and has mechanical means for adapting it for use in connection with emergency or parking brakes, if desired. It will be noted that the entire brake structure is enclosed by the dust cap member 64 and the closure plate 45, and the dissipation of heat generated by operation of the brake is effected by the air circulating and dissipating means 60', 61', 53' and the ribs 66 provided upon the outer surface of the drum 55. Further, uniform and positive actuation of the brake will occur due to the application of pressure at a plurality of points about the inner periphery of the shoe member 67 by means of the pressure plate 76, and consequently uniform expansion and contraction of the brake shoe is effected. The two-point contact of member 87 with the collar 79 takes up any misalignment that may occur.

Briefly, comparing the operation of the brake shown in Figure 2 with the diagrammatic sketch of Figure 1, it will be noted that the drum 55 corresponds to the drum 20 of Figure 1, and that the brake shoe 67 corresponds to the brake shoe 22 of Figure 1. The angularly inclined means 24 shown in Figure 1 finds its counterpart in Figure 2 by the spaced lugs 73 which are engaged by the pressure transmitting plate 76, corresponding to the surface 26 of the member 25 of Figure 1, which member 25 corresponds to the collar 79. The brake operating means shown at 28 in Figure 1 corresponds to the actuating lever 108 and pivoted member 87 of Figure 2, pivoting the member 87 about the stud 91 resulting in movement of the collar member inwardly. The cam members 84 of Figure 2 are shown as mounted upon the collar 83, which is secured in fixed position with respect to the axle housing. These correspond to the cam surfaces 32 mounted upon the stationary member 29 secured to the axle housing 30 of Figure 1. The cam surfaces 81 formed in the collar 79 correspond to the cam surfaces 33 carried by the pressure applying means 25 of Figure 1. It will thus be seen that in operation and principle the structure shown in Figure 2 corresponds in detail with the diagrammatic showing in Figure 1, and operation thereof is effected in the same manner.

Considering now in detail Figure 3, which is an adaptation of my invention to the front wheel of an automobile of well known manufacture, I show the front axle of the automobile indicated by the reference numeral 120. A steering wheel spindle member 121 is pivoted upon the end of the axle 120 by means of the king pin member 122, which member is of a special form to be hereinafter described. The wheel shown in Figure 3 comprises a rim 124 supported by a plurality of spokes 125 spot-welded to the inner periphery thereof and welded at their inner ends to the tubular hub or shell formed of sheet metal members 126 and 127. These members are preferably secured together as by welding. A suitable hub cap 128 closes the cylindrical member 127, and covers the end of the spindle 121. The member 126 is provided with a flared end having a flange portion 129 adapted to overhang or engage a brake drum member 130, which member 130 is connected to the hub 131. The hub is rotatably mounted about the spindle 121 by means of the bearings 132 and 133, providing radial and axial support. Threaded studs 134 are provided for mounting the wheel releasably on the fixed part of the hub 131. Clamping nuts 135 are threaded over the studs 134 to lock these parts together. The drum 130 has a plurality of circumferential cooling ribs or flanges 136, which correspond in function to the ribs 66 of Figure 2. A closure ring or gutter 137 of pressed sheet metal overhangs the outer flared end of the drum 130, and is mounted, at its inner end, on a pressed closure or anchor plate member 138 which is secured at its inner end, by means of bolts 139, to the knuckle 140. A centering or guiding member 141 is also secured to the spindle block 140.

The hub member 127 is preferably provided with a plurality of spaced openings 127', which may optionally be provided with deflecting baffles, for admitting air to the interior thereof. This air is conducted through openings 128' and 129' to the interior of the drum 130, substantially as described in connection with Figure 2, for circulating cooling air past the brake drum and brake shoe surfaces. This air passes out through the annular opening between the guard member 137 and the large end of the drum 130.

The king pin 122 is provided with a centrally extending passageway 142 which is adapted to receive a thrust rod 144 having a spherical head 145 adapted to be engaged by a convex recess in the offset portion 146 which is carried by the brake actuating shaft member 147. The member 147 is journaled within a housing 148 secured in the upper end of the king pin 122, and is rotated by means of a lever connected to a brake pedal or the like to cause downward movement of the thrust pin 144. The king pin 122 extends through and is pinned in the end of the axle 120, and serves as a pivot for the knuckle 140, in the usual manner.

At its lower end, the thrust pin 144 is tapered, as indicated at 150, and is adapted to extend between a pair of roller members 151 and 152. The roller member 152 is mounted upon a shaft 153 by means of suitable roller bearings, and is held in fixed position within the housing 154 which is disposed about the lower end of the king pin and secured to the closure plate member 138. Thus, upon downward movement of the thrust pin 144, the tapered end 150 thereof wedges between the rollers and tends to move the roller member 151, mounted upon shaft 155, to the left as viewed in Figure 3.

As shown in detail in Figure 4, the roller member 151 is carried between a pair of lugs 156 through which the shaft 155 extends, the lugs being formed integral with a ring-shaped lever member 157. The lever 157 is provided with two pressure applying lugs or bearing arms 158, one of the arms being shown in detail in Figure 5. These arms are disposed on a diameter passing through the axis of the brake. The pressure applying lever 157 is pivoted at its upper end by means of an enclosing socket portion 159 engaging about a rounded bar member 160 carried by the threaded adjusting stud 161. The stud and bar form a T-shaped fitting. The adjusting stud 161 has threads cooperating with threads in an adjusting nut 162 which is mounted for rotative adjustment in the closure plate member 138, by means of a split clamping ring 163 on the outside and an overhanging flange on the other. The bushing or nut member 162 is provided with a hexagonal outwardly extending head portion 164 which is adapted to be engaged by a wrench for rotating the bushing 162. Rotation of the bushing 162 causes inward or outward movement of the adjusting stud 161 and consequently changes the location of the pivot pin portion 160 to advance or retract the arms 158 with respect to the spreader plate 165. This, in turn, adjusts the axial position of the cone or shoe 171. The spreader or pressure transmitting plate 165 is centered upon the member 141 and is provided with struck out portions 166, the bottom edges of which form bearing surfaces engaging the bearing bosses 158. The inner peripheral edge 167 of the plate 165 is flanged axially rearwardly to engage the centering member 141.

By the disposition of the arms 158 at opposite sides of the thrust plate 157, substantially equal pressure is applied to the periphery of the pressure transmitting plate 165, and substantially uniformly distributed pressure is transmitted thereby to the brake shoe. The plate 165 is guided on the member 141.

The adjustment of the pivot of the inside actuating lever 157 is unique. The lever is a second class lever increasing the braking pressure on a two to one ratio. The head of the T-shaped member serves both as a journal, of a limited degree of motion, and holds the shank 161 so that it will not turn when the adjusting nut is turned from the outside.

Adjustment of the brake is especially easy. The wheel is jacked up and the nut 162 turned until the brake begins to engage the drum, then the nut is backed off just enought to free the drum from rubbing. The adjustment is then complete.

The pressure plate 165 is provided, at its outer periphery, with a plurality of notches indicated at 168 which are adapted to engage inclined bearing surfaces 169 carried by separately formed camming lugs 170 secured to the conical brake shoe 171. In this construction the lugs 170 perform the dual function of connecting the pressure transmitting member 165 and the cone 171, and of forming a part of the servo mechanism. The notches 168 overhang the lugs 170 and the inner edges of the notches engage the angular surfaces 169 in much the manner described in connection with Figure 2, where the notches 75 in the pressure transmitting plate 76 engage the surfaces 74 of the lugs 73. The lug member 170 may be riveted to the inner surface of the conical brake shoe, as indicated at 172, or may be welded or otherwise suitably secured thereto.

It is to be observed that in this embodiment the servo mechanism does not operate through the pressure applying member or plate 165, but acts directly between the stationary frame and the conical shoe. Thus the shoe 171 is engaged by two separate members, namely, the stationary brake plate 138 and the movable spreader plate 165, and is held solidly by them. This provides an unusually solid support and applies the brake pressure evenly. In the embodiment shown there are six lugs 170, thus applying the external holding pressure and the internal or servo pressure at six points. As a result, chatter and squeaking does not occur. I believe it is broadly new to apply the servo action at the full radial extent of the shoe. It will be seen that the servo mechanism is placed substantially on the face of the larger diameter end of the shoe and actually beyond the radius of the smaller end.

The conical brake shoe 171 is a substantially channel-shaped member having the inturned edge portions 173 and 174. These flanged edges give great stiffness to the shoe sections. The member is slotted, as indicated by the slots 175 and 176 which extend alternately from the opposed end portions 173 and 174, to impart to the brake shoe member an inherent and resilient expanding and contracting characteristic. The shoe member is also provided, on its outer periphery, with a friction braking surface 177 riveted thereto at a plurality of points 178. This friction material is preferably slotted to correspond to the slots carried by the brake shoe. The outer surface of the friction band 177 engages the inner periphery of the drum member 130 to effect braking of the drum.

Considering now in detail the camming lugs 170, these lugs are provided with converging cam surfaces 179 and 180, which surfaces correspond to the camming surfaces 81 of the pressure plate 79 of the embodiment shown in Figure 2. The camming lug 170 is preferably made as a forging arm and may be recessed as indicated at 181. The surfaces 179 extend substantially radial to the inner periphery of the shoe member 171. The closure plate 138, which is secured in fixed position on the knuckle 140, is provided with an inwardly extending cylindrical flange portion 182, to which flange portion is welded, or otherwise suitably secured, servo cam lugs 183 having converging cam surfaces 184 and 185 extending normal to the surface of the flange portion 182 of the member 138. The camming lug 183 is shown in detail in Figure 8. Rolling engagement instead of sliding engagement may be provided.

In the operation of the modification shown in Figure 3, upon actuation of the brake pedal by the operator of the vehicle, the shaft 147 is rotated, through a leverage connection, to force the thrust pin 144 downwardly between the rollers 151 and 152. The roller 152 being fixed in position, the roller 151 is moved inwardly, and the lever 157 pivots about the pin member 160 to force the arms 158 against the pressure transmitting plate 165. This effects axial movement of the pressure transmitting plate 165 along its centering member 141, and, by the engagement of the edges of the bottom of the notches 168 with the angular surfaces 169 of the lugs 170, moves the conical brake shoe axially into engagement with the brake drum 130. This results in engagement of the friction surface 177 with the interior surface of the brake shoe, tending to stop rotation of the wheel. The cam 170 is disposed between the camming surfaces 184—185 of the lug 183 carried by the brake plate 138. As the brake shoe is moved into engagement, and the friction surface 177 engages the drum, there is a tendency for the shoe to rotate with the drum. This tendency results in the surface 180 of the camming lug 170 engaging the corresponding surface 184 of the lug 183, and because of the angularity of these surfaces there is a tendency to assist the force which moves the shoe axially inwardly. This results in an additional pressure, which I term the servo, or camming action. When the wheel is rotating in the opposite direction the same effect will be produced by the cam surfaces 179 and 185.

The release of the brakes is as follows. As soon as the externally applied pressure on the plate 165 is relaxed the cone tends to contract and this shoves the pressure applying plate 165 aside. At the same time, the relaxation of pressure by the plate 165 allows the cone to back on the servo cam to the extent of relieving itself of pressure. The retracting springs, three or more in number, (not shown) engaged in openings 178 in the shoe and extending through openings 187 in the plate 165, connect the small end of the cone with the brake plate 138, then retract the cone to its free or off position, which is just far enough away to clear the drum.

While in the embodiment of Figure 3 the servo action was exerted on the shoe through the same member, i. e., the pressure plate 165, as that through which the externally applied braking pressure was applied, in the present embodiment of Figure 2, the two efforts are applied to the shoe through separate members.

The embodiment of the invention shown in Figure 9 corresponds in general with the structure shown in Figure 2, but differs therefrom in showing the application of the braking system to a front wheel instead of a rear wheel, and further, showing the use of a hydraulic actuating means in place of the mechanical screw shown in Figure 2. Similar parts of the braking structure of this modification which correspond to the parts described in connection with Figure 2 have been indicated by corresponding reference numerals.

In this embodiment, a front axle is indicated at 190, and a knuckle 191 is mounted in the usual manner thereon, having the outwardly extending spindle 192 which rotatably supports the hub 193 of the wheel, as by means of suitable bearings 194 and 195. The hub 193 has formed integral therewith the brake drum 196 having axially extending fins 197, corresponding to the fins 66 of Figure 2. Secured to the radially extending flange portion of the hub 193 is the wheel disk 198 secured thereto by means of cap screws 199, and covered by a closure plate 200 held in position by the hub 201 threaded onto the hub. The disk 198 has a flange which is spot-welded or otherwise suitably secured to the rim 58 of the wheel.

In this embodiment, ventilation and cooling of the brake surfaces are provided by openings 200' and 201' formed in the hub cap 201, which, as shown by the arrows, allow circulation of external cooling air through the hub cap and through openings 193' formed in the flange portion of hub 193 into the interior of the brake drum. A portion of this air passes outwardly through openings 199' into the path of the rotating fins 197 of the brake drum. The remainder of the air passes along the inner surface of the brake drum and outwardly through the annular opening between the drum and the lip 65 of closure member 45.

The brake plate 45 of the brake structure is suitably secured against rotation by connection with the knuckle 191, and its inner extending flanged portion 83 is provided with a plurality of camming lugs 82 corresponding to the lugs described in connection with Figure 2. In this particular modification, I have shown the lugs as comprising an odd number of lugs and therefore not diametrically disposed about the periphery of the flange 83. The lugs engage in suitable camming blocks 81 formed in the collar member 79 which carries the pressure transmitting plate 76 engaging the brake shoe 67. The collar 79 is urged inwardly to force the brake shoe into engagement with the brake drum 196 by means of the ring-shaped thrust lever 87, which has the bearing bosses 88 projecting therefrom and engaging the collar 79 at diametrically opposed points. This particular engagement of the collar 79 provides for uniformity of pressure application by the pressure plate 76 to the brake shoe 67, inasmuch as it allows for oscillatory movement of the collar 79 about a horizontal axis. The thrust plate 87 is pivoted on the stud 91 as previously described, to allow for limited universal freedom, and its head portion or boss 99 is engaged by a plunger 204 carried by the piston member 205 disposed within the pressure cylinder 206. Thus a flexible but positive system of applying the pressure is provided.

The cylinder 206 is secured to the outside of the closure plate 45 by means of a plurality of cap screws 207 or by fixed studs 221, as shown in detail in Figure 12. A resilient sealing member 208 closes the inner end of the cylinder 206 and is held in position by means of a cover plate member 209 riveted at 210 or otherwise suitably secured to the closure plate 45.

The cylinder 206 provides for reciprocatory movement of the piston 205 which carries the plunger 204. The head end of the plunger 204 actuates the thrust plate 87 to move the brake surfaces into engagement.

A suitable pressure conduit, indicated at 211 (see Figure 12) is connected into the head end of the cylinder 206, through an offset port 212. Fluid under pressure is thus admitted to the head end of the piston 205, and when the pressure is increased the piston 205 and plunger 204 are moved inwardly to swing the thrust plate 87 about the stud 91 to engage the brake. A suitable spring member 213 is provided to take up slack and to prevent any play between the plunger 204 and the boss portion 99 of the thrust plate 87. A bleeder vent 214 is also provided, and is closed by means of the bleeder plug 215. This is for removing trapped air in the cylinder 206 at the head end of the piston 205. The actuation of the plunger 204 against the boss portion 99 results in operation of the brake, whether the plunger is mechanically or hydraulically operated.

It will be noted that the cylinder 206 is easily accessible and may be readily removed from the brake structure by merely loosening the cap screws 207, so that servicing and replacement of the parts therein may be readily facilitated.

Figure 13:
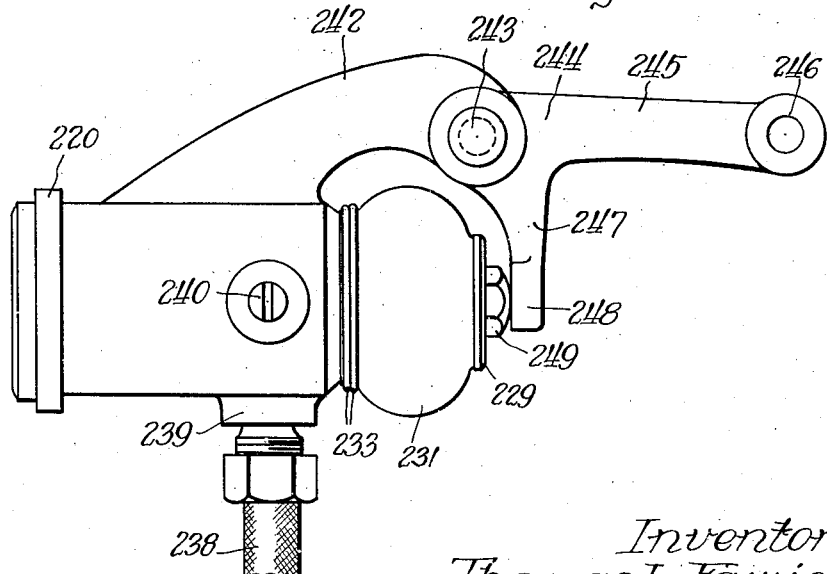
Figure 13 is a top plan view of a hydraulic actuating member provided with a unit for embodying parking or emergency braking systems therewith.

In Figures 13 and 14 I have shown an actuator which is both hydraulically and mechanically operable. In this particular embodiment the brake shoe 67, provided with the friction braking surface 71, and engaged by the pressure transmitting plate 76, corresponds to the structure described in Figures 2 and 9. The thrust plate or lever 87 has a boss portion 99 engaged by the head end 216 of a plunger 217 carried within a piston 218 reciprocable in the cylinder 219.

The cylinder 219 is provided with a flange portion 220 which is suitably secured to the closure plate 45 of the brake structure by means of the bolts 221 and the castellated nuts 122. At the inner end of the cylinder 219 a resilient closure member 223 is provided, retained in position by the cap member 224 riveted as shown at 225 to the plate member 45.

The piston 218 is provided with a semi-resilient head or cup leather 226 having a recess therein receiving the head 227 of a plunger member 228 which is engaged therein and which, at its other end, is provided with a reduced portion carrying a pair of annularly flanged closure plates 229 engaging the beaded edge 230 of a rubber dust cap member 231 engaging at its opposite edge in a groove formed in the extending end 232 of the cylinder 219. The cap member 231 is held in position by means of a suitable spring member 233.

A suitable packing member 234 formed of yielding material is disposed in the head end of the cylinder 219 and engages the surface of the plunger member 228. This member prevents leakage of pressure from the chamber indicated at 235 past the surface of the plunger member 228 into the cap member 231. A suitable helically coiled spring 236 is disposed about the plunger 228 and is biased at one end against the collar 227 and at its opposite end against the packing member 234, normally urging the plunger member inwardly. The chamber 235 is supplied with fluid under pressure through the conduit member 238 shown in Figure 13, which is connected through the port 239 to the interior of this chamber. A suitable bleeder plug 240 is also threaded into the chamber.

Thus, upon actuation of suitable mechanism within the vehicle, the fluid pressure in the chamber 235 is increased to such an extent as to cause inward movement of the plunger piston 218, and consequent movement of the plunger 216 into engagement with the boss portion 99 of the pivoted thrust plate 87, which causes inward movement of the brake shoe 67 into engagement with the brake drum carried by the rotating wheel. Pneumatic operation may be provided by increasing the relative size of the actuating means.

For the operation of emergency or parking brakes I provide the cylinder 219 with an exteriorly extending curved arm, indicated at 242, provided with a vertical pivot portion 243 adapted to be connected to an emergency or parking brake leverage system by means of a pivot connection at its end 246. The other arm 247 of the rocker arm 244 is provided with a boss portion 248 adapted to engage the head 249 of the plunger member 228. Thus, upon actuation of the emergency or parking brake, the rocker arm 244 is pivoted about the pivot pin 243, and the boss portion 248 thereof engages the headed end 249 of the plunger to force the plunger inwardly, which results in forcing the piston 218 inwardly and thus pivoting the thrust plate 87 to cause engagement of the brake. By reason of the resilient nature of the cap member 231, the plunger can be moved inwardly to an extent necessary to cause operation of the brake. Upon release of pressure between the rocker arm 244 and the plunger 228, the retracting springs carried by the shoe 67 and connected to the plate 45 will withdraw the friction surface 71 from engagement with the brake drum, and will return the thrust plate 87 to its normal unengaged position, thus forcing the piston 218 outwardly and returning the plunger 228 to its normal unengaged position.

In Figure 15 I have shown a rear wheel brake corresponding to the front wheel brake of Figure 3. A full floating axle housing 260 carries the wheel through bearings 262, the spindle 36 being keyed to the solid hub member 263. The pressure transmitting member or plate 165 is substantially identical with that shown in Figure 3, except that at its inner end it is guided on the hollow guide member 141 through the use of a small helical coil spring 266, which is held on the edge of the plate 165 in engagement with the hollow cylindrical guide 141 to provide a slight frictional grip and to prevent rattling. The retracting spring for the brake of both Figure 3 and Figure 15 is shown at 267 in Figure 16. This spring is anchored at one end to a small cup-shaped housing 268, which is snapped into a hole in the brake plate 138. The opposite end of the spring extends through a hole indicated at 269 in the pressure plate 165 and is hooked to the shoe. The brake plate 138 has an integral gutter or flange 270 extending around and enclosing the rim of the brake drum 130. A separate ring or annular plate 272 is welded to the inside of the brake plate, and it has ears 273, 273 struck out as shown in Figures 15 and 17, to include an angle of approximately 60° between them for receiving the servo cam 181 with its tapered surfaces 179 and 180 between them.

This extension of the brake plate serves to give greater rigidity. The swinging lever 157 is the same as shown in Figures 3 and 4, except that the pivot stud 161 is mounted below, and the actuation of the lever is secured through a stud 274 which has a threaded portion 275 engaging in threads in the actuator collar 276. The operating lever 277 is bolted to the outer end of the shank of the rod 274, and a dust collar 278 embraces grooves in the hub of the lever 278 and the end of the collar 276. By angular motion of the lever 277, the thrust rod 274 is thrust against the socket 279 in the ring-shaped lever 157, and through the bosses 158, 158 (see Figure 4) pressure is applied to the thrust transmitting member 15 or plate 165.

The operation of this brake is substantially as hereinabove referred to in connection with Figure 3 and Figure 2, in that the manual application of pressure through the lever 157 carries the pressure transmitting plate 165 to the left. This plate tends to equalize the pressure upon all of the lugs 170, and tends to climb the incline of those lugs. Preferably the retracting springs 267 are not stiff enough to compel an expansion of the brake shoe 174, but instead, the shoe is carried axially to the left until it engages the conical surface of the drum 130. Thereupon, rotational reaction is developed at the cam lugs 181, and these, operating through the stationary ears 273, 273, assist in applying further pressure axially to the brake shoe. It is to be observed in this form of brake that axial pressure as produced by the servo cam would tend to force the collapsible brake shoe further into the drum, but due to the collapsibility of the shoe no effective pressure would be developed. However, the brake plate 165 acts to prevent the collapse of the shoe so long as pressure is manually applied to it. In other words, the manual application of pressure acts, as it were, to hold a fulcrum through the reaction of which the servo mechanism is able to be effective.

In the form of brake shown in Figure 2, the servo mechanism acts through the fulcrum or pressure applying plate.

I contemplate that both self-releasing surfaces, namely, those surfaces on the face of the lugs 170 and the servo cam surfaces, may be embodied in a single surface having components both axially and rotarily, with separate members extending individually from the segments of the cone and guided in unison. I do not, therefore, intend to be limited to the specific embodiments herein shown. The brake or shoe may be divided into separate rigid segments suitably held in alignment and pulled towards a common center radially by springs, being thereby inherently self-collapsing instead of having a single resilient member inherently self-collapsing, as herein illustrated. Also, instead of having sliding cam surfaces, rolling engagement as by anti-friction rollers may be employed, so long as the law of operation herein explained is preserved.

It is to be observed that the brake has a peculiar ability to equalize itself, even if the fit of the shoe and the drum is not strictly accurate.

The servo mechanism herein shown is essentially a means for converting the torque reaction of the shoe into brake applying pressure, preferably exerted primarily in an axial direction, and, secondarily, in a radial direction, through the action of plate 165 in Figure 2, and wholly in an axial direction against the reaction of plate 165, in Figure 3.

My invention contemplates the use of toggles, as distinguished from cams, although I prefer the use of cams, with or without anti-friction devices, in view of the substantal constancy of the angles involved.

It will be noted that in each of the embodiments of the invention, the actuating means, whether it be mechanical, hydraulic, or a combination of the two, may be or is disposed exteriorly of the brake enclosing housing, and is freely accessible for servicing, adjustment, repair or replacement. Further, it will be noted that the brake structure within the housing may be thus operated, regardless of whether mechanical or hydraulic actuation is provided, and therefore interchangeable actuators may be employed, depending upon the particular type of braking system employed in the vehicle. Also, either an hydraulic or mechanical actuating means may be employed wherein a supplemental mechanical actuator is used in combination therewith for parking cr emergency brakes which work through the hydraulic unit, and which is entirely sealed.

In connection with the production of an economical and simplified type of brake structure, it is to be noted that the closure member for the brake housing, the pressure transmitting plate, the brake shoe, and various other parts of the brake structure are formed from die pressed sheet metal, which provides uniformity and standardization of parts, and economy in the cost of the brake construction. Also, in this connection, it should be noted that the cone and facing for the brake may be easily replaced and easily serviced. The conical brake shoe is expansible and contractible and provides for uniform application of pressure. Wedging or locking of the cone within the brake drum, regardless of its angle of friction surface, is prevented by its own collapsibility. Further, substantially uniform expansion is provided inasmuch as the pressure tending to force the cone into engagement with the brake drum is applied at a plurality of points about the periphery of the cone. This uniformity of pressure application also prevents distortion of the braking surfaces, resulting in longer life and increased efficiency of the brake.

It is to be particularly noted that the servo action may be effected either by camming lugs carried directly by the brake shoe or cone, engaging corresponding lugs carried by the stationary closure plate, or by camming surfaces formed in the pressure applying means and engaging any suitable stationary camming lugs. This servo action provides for a more powerful application of the brake without increased pressure upon the brake operating means, producing a more efficient braking action. The servo action is effective, regardless of the direction of rotation of the brake drum.

It is also apparent that, by the provision of the ventilating ribs or fins carried by the brake drum, a novel method of preventing heating of the tires due to the friction generated between the braking surfaces is prevented, since these fins, or ribs, in conjunction with the air passages, provide for circulation of air past the brake surfaces and, further, are advantageous in quickly dissipating heat generated between the brake drum and the brake shoe liner.

While I have described herein certain specific embodiments of my invention, I do not intend to be limited to the details disclosed, except as they are recited as essentials of the parts or combinations herein claimed. I intend to include within the claims all such modifications of the invention as will occur to those skilled in the art, so long as they contain substantially the principles herein disclosed, and constitute means having substantially the modes of operation herein disclosed.

I claim:

1. In a device of the class described, a brake drum for frictional contact having a frictional surface with a component in an axial direction and a component in a radial direction, a cooperating brake shoe movable into position to engage the frictional surface with bearing thereagainst in both said directions, means for pressing the shoe manually in one of said directions to cause frictional engagement of the shoe with the drum, tending to carry the shoe with the drum, and torque actuated means for producing additional pressure of the shoe against the drum.

2. In a device of the class described, a conical brake drum, a conical shoe, means for pressing the shoe radially against the drum, and servo mechanism acting substantially at the edge of the shoe for pressing said shoe axially into engagement with said drum.

3. In combination, a conical brake drum, a conical shoe, means movable in a direction axially of the shoe for supporting the radial reaction of pressure between said shoe and said drum, and means actuated by the torque reaction between said drum and shoe for forcing the shoe axially against the drum.

4. In combination, a conical drum, an expansible conical brake, an expander for said brake, said expander and said brake having engagement on a self releasing angle, manual actuating means for the expander, and a servo mechanism actuated by torque reaction of the brake and drum to increase the pressure between the brake and drum, said servo mechanism acting on a self releasing angle.

5. In combination, a brake drum, a brake therefor, a brake plate covering the end of the drum, a lever disposed transversely to the axis of the brake drum for applying the brake to the drum, a pivotal mounting for one end of the lever supported on said plate, a thrust member also mounted on the plate for engaging the free end of the lever, and an actuator plate having engagement with said brake on a self-releasing angle, said lever having engagement with said actuator plate intermediate its ends.

6. In combination, a brake drum, a brake therefor, a brake plate covering the end of the drum, a lever disposed transversely to the axis of the brake drum for applying the brake to the drum, a pivotal mounting for one end of the lever supported on said plate, a thrust member also mounted on the plate for engaging the free end of the lever, said lever having connection with said brake intermediate its ends, said pivotal mounting comprising a threaded bushing rotatably mounted in the plate and having its outer end closed, and a pivot stud threaded in said bushing and non-rotatably pivoted to the inner end of the lever.

7. In combination, a drum, a brake plate for the drum, a brake for the drum, a lever mounted on the drum side of the brake plate for applying the brake to the drum, an actuator mounted on the outside of the plate, having a thrust rod extending through the plate into engagement with the lever, and two independent manually controlled devices for moving said thrust rod.

8. In combination, a wheel, an axle for the wheel, a conical brake drum carried by said wheel, an expansible frusto-conical brake shoe within said drum having inwardly extending lugs, pressure applying means carried on the axle and being movable axially of said shoe into engagement with said lugs to expand said shoe, and manually operable means for moving said pressure applying means axially to expand said shoe.

9. In combination, a brake structure including a conical brake drum, a stationary closure member extending about the larger end of said drum, an expansible frusto-conical brake shoe disposed within said drum, means supported coaxially therewith and capable of axial movement to expand said brake shoe into engagement with said drum, means pivoted on the inner face of said closure member and engaging said expanding means, retractile means for said shoe, and means projecting externally of said closure member for actuating said pivoted means.

10. In a brake for a road wheel having a brake drum, a conical brake shoe member, an axially movable pressure applying member adapted to expand said brake shoe radially outwardly, a pressure transmitting member engaging said pressure applying member, and an enclosing anchorage member for limiting rotation of the shoe member and forming a support for the pressure transmitting member.

11. In combination, a conical brake drum, a conical brake shoe expansible into engagement with said drum, spaced lug members projecting inwardly from the inner periphery of said shoe, pressure transmitting means engaging each of said lug members, and pressure applying means for moving said transmitting means axially of said shoe to force said lug members uniformly outwardly to expand said shoe.

12. In combination, an expansible brake shoe of frusto-conical form having inwardly projecting lug portions, a pressure plate engaging said lug portions and having opposed bearing portions, means comprising a pivoted lever member having engagement with said bearing portions for moving said plate axially inwardly of said cone, said movement causing uniform radial outward movement of said lug members to expand said cone, and resilient retracting means for said cone.

13. In combination, in a brake structure, a stationary closure plate, a thrust lever, pivot means for one end of said lever carried by said plate, actuating means for the opposite end of said lever carried by said plate, a pressure transmitting member, a brake shoe of frusto-conical form divided into segments, means carried on the inner periphery of said segments and engaged by said pressure transmitting member to expand said segments radially outwardly upon engagement of said lever with said pressure transmitting member.

14. In combination, a conical brake drum, a conical brake shoe, axially movable thrust means for expanding said shoe into engagement with said drum, camming shoulders on said shoe, and stationary corresponding camming shoulders tending to move said brake shoe axially toward said drum upon a rotative effort being imparted to said shoe by said drum.

15. In combination, a conical brake drum, a conical brake shoe, axially movable thrust means for expanding said shoe into engagement with said drum, angularly reacting surfaces on said shoe disposed radially outwardly of said thrust means, stationary members engaging said surfaces and tending to urge said shoe toward said drum upon engagement between said drum and shoe, and retracting means for retracting said shoe along said angularly reacting surfaces.

16. In combination, a brake drum, braking means including an expansible brake shoe and means engaging said shoe and operable to expand said shoe into engagement with said drum, means carried by said shoe providing a plurality of pairs of converging camming surfaces carried by said braking means, stationary means providing a corresponding plurality of stationary converging camming surfaces, one surface of each of said pairs of surfaces being adapted to engage the corresponding surface of the other pair to move said shoe inwardly upon engagement between said shoe and drum, and retracting means tending to retract said shoe.

17. In combination in a brake structure, a conical brake drum, a conical brake shoe, means for expanding said shoe into engagement with said drum, a fixed closure member disposed adjacent the larger end of said drum, lever means for actuating said expanding means, pivot means for said lever means carried on the inner face of said closure member and adjustable exteriorly of said member, and actuating means mounted on the outer face of said member and extending therethrough into engagement with said lever.

18. In combination in a brake structure, a brake drum, a brake shoe, means for expanding said shoe into engagement with said drum, a closure member for said structure, pivot means extending inwardly of said member and having outwardly projecting adjustment means, pressure transmitting means pivoted thereon and engaging said expanding means, thrust means removably mounted on the outer face of said member and extending therethrough for applying pressure to said transmitting means, and two independent manually controlled devices for actuating said thrust means.

19. In combination, a conical brake drum, a conical brake shoe, the angle of conicity with the axis of the drum being approximately 22 degrees, a thrust transmitting member movable axially to press the shoe into engagement with the drum, said member and said shoe having cooperating contact faces with an effective angularity with said axis of approximately 45 degrees, and a servo mechanism operated by relative torque between the shoe and the drum employing engaging surfaces having an effective angularity with a line parallel to said axis of approximately 30 degrees.

20. In combination, a conical drum, a conical expansible brake, brake applying means movable longitudinally of the axis of the drum, thrust transmitting means for converting longitudinal pressure partially into radial pressure, the ratio of radial pressure to axial pressure of said means being less than the coefficient of friction of said thrust transmitting means.

21. In combination, a conical drum, a conical expansible brake, brake applying means movable longitudinally of the axis of the drum, thrust transmitting means for converting longitudinal pressure partially into radial pressure, the ratio of radial pressure to axial pressure of said means being less than the coefficient of friction of said thrust transmitting means, and servo means for converting torque reaction of the brake partially into axial thrust upon the brake, the ratio of axial thrust to angular thrust of said means being less than the coefficient of friction of said servo means.

22. In a brake structure for a road wheel mounted on a pivoted spindle and having a conical expansible brake shoe, means for expanding said brake shoe, means for applying pressure to said expanding means, means supported on said spindle providing an adjustable pivotal support for said pressure applying means, and means extending through said pivoted spindle for actuating said pressure applying means.

23. A brake shoe comprising a frusto-conical member capable of being radially expanded, a plurality of thrust receiving means spaced about the periphery thereof, and a thrust transmitting member having self-releasing engagement with said thrust means for applying a substantially uniform radial expanding pressure thereto upon axial movement of said member.

24. In a braking system, a brake drum having a conical friction surface, an expansible conical brake shoe, and an expander for the brake shoe, said expander being movable axially of and having contact with the shoe on an angle to the axis of the shoe which is so great as to permit the expander to be self releasing from the shoe.

25. A brake shoe comprising a frusto-conical sheet metal member, said member at its smaller end having an inwardly extending flange, said flange providing spring anchorage at a plurality of points, and said member being provided with a plurality of axially extending slits which divide the flange into separate segments and render the member expansible and contractible.

26. A brake shoe comprising a frusto-conical sheet metal member, said member being slit to divide the member into cooperating segments, each of said segments having an inwardly facing lug provided with an inclined surface having an angle with the axis of the member such as to render said member self releasing with respect to a thrust member engaging said surfaces.

27. A brake shoe comprising an expansible and contractible frusto-conical member having inwardly projecting thrust means for expanding said shoe, said thrust means having surfaces disposed about the axis of said member to produce a substantially balanced outward thrust when engaged by a thrust member and being inclined to said axis at a self releasing angle.

28. In combination with a brake shoe of frusto-conical form comprising a plurality of segments movable radially inwardly and outwardly, said shoe having inwardly projecting means actuable to move said segments outwardly, axially movable pressure applying means for engaging said first means, said pressure applying means and first means meeting at such an angle to the axis of said shoe as to prevent self locking therebetween.

29. In combination, a conical brake drum, a conical expansible and contractible brake movable axially to contact the drum, means to block contraction of the brake, manual means for moving said blocking means and said brake axially together, and servo means for moving said blocking means in a direction to apply the brake.

30. In combination, a conical brake drum, a conical expansible and contractible brake movable axially to contact the drum, means to block contraction of the brake, manual means for moving said blocking means and said brake axially together, and servo means acting upon the brake independently of the blocking means.

31. In combination, a conical brake drum, a conical expansible and contractible brake having limited axial and rotary motion, and camming surfaces for converting axial motion of the brake partially into expanding motion and for converting rotary motion of the brake partially into axial motion of the brake.

32. In combination, a conical brake drum, a collapsible conical brake, automatic means for forcing the conical brake axially into the drum through pressure applied at an angle which is self-releasing, and manual means for preventing collapse of the cone.

33. In combination, a wheel having a conical brake drum, a conical brake, an axle for the wheel, a brake plate for the drum, said plate having a flange cooperating with the margin of the drum, thrust member for applying the brake to the drum, a ring-shaped lever pivoted on the plate at one point, thrust means for actuating the lever at a point diametrically opposite said one point, bosses on said lever for engaging said thrust member at two opposite points intermediate the ends of the lever, servo means on the brake and cooperating servo means on said plate adjacent said flange for automatically applying pressure to the brake.

34. In combination, a conical brake drum, a brake plate for the drum, a conical brake for the drum, a lever mounted on the drum side of the brake plate for applying the brake to the drum, an actuator mounted on the outside of the plate, a thrust member carried by said actuator and extending through said plate into engagement with said lever for imparting axial movement to said brake through said lever, and two independent manually controlled means for moving said thrust member axially of itself against said lever.

35. In combination, a brake drum, a brake for the drum, a brake plate for the drum, a lever mounted on the drum side of said plate for applying the brake to the drum, an actuator mounted on the outside of the plate, a plunger carried by said actuator and extending through said plate into engagement with said lever, and two separate manually controlled means for moving said plunger longitudinally through said plate against said lever to impart axial movement to said brake against said drum.

36. In combination, a conical brake drum, a conical shoe, means for pressing said shoe against the drum, and servo mechanism disposed radially outwardly of said pressing means within said shoe and operable upon rotative movement of said shoe with said drum for moving said shoe axially into further engagement with said drum.

37. In combination, a rotatable wheel carrying a brake drum, a brake shoe, an axle assembly supporting said shoe, means for moving said shoe axially into engagement with said drum, and means carried by said assembly axially and radially within said shoe and actuated by the torque reaction between said shoe and drum for producing additional pressure of said shoe against said drum.

38. In combination, a rotatable brake drum, a brake shoe, a stationary plate, thrust means movable normal to the plane of rotation of said drum, means pivoted on said plate and actuated by said thrust means for moving said shoe axially into engagement with said drum, and servo mechanism carried by said plate and engaging said shoe to produce additional pressure of said shoe against said drum.

39. In combination, a rotatable brake drum, a substantially non-rotatable shoe, means for moving said shoe axially into engagement with aid drum, and stationary means disposed adjacent the outer periphery of the shoe for camming said shoe into further engagement with said drum upon torque being imparted to said shoe by said drum.

40. In combination, a rotatable brake drum, a substantially non-rotatable shoe, means for moving said shoe axially into engagement with said drum, stationary means disposed adjacent the outer periphery of the shoe for camming said shoe into further engagement with said drum upon torque being imparted to said shoe by said drum, and means providing for self-release of said shoe from locking engagement with said drum upon stopping of rotation of said drum.

41. In combination, a brake drum, a brake shoe, thrust means disposed radially within said shoe for applying said shoe to said drum, and means lying radially outwardly of said thrust means within said shoe and energized upon slight rotative movement of said shoe in either direction for increasing the pressure of application of said shoe to said drum.

42. In combination, a brake drum, a brake shoe, thrust means disposed radially within said shoe for applying said shoe to said drum, and means lying radially inwardly of said thrust means within said shoe and energized upon slight rotative movement of said shoe in either direction for increasing the pressure of application of said shoe to said drum.

43. In combination, a brake drum, a brake shoe within said drum, thrust means carried on the inner surface of said shoe, a thrust plate lying radially within said shoe and having means engaging said thrust means, and means operable to apply an axial thrust to said plate for applying said shoe to said drum.

44. In combination, a brake drum, a brake shoe within said drum, thrust means carried on the inner surface of said shoe, a thrust plate axially movable with respect to said shoe and having means engaging said thrust means, and means carried by said shoe and operable upon slight rotative movement of said shoe for increasing the axial pressure of said shoe against said drum.

45. In combination, a brake drum, a brake shoe within said drum, thrust means carried on the inner surface of said shoe, a thrust plate axially movable with respect to said shoe and having means engaging said thrust means, and means carried by said thrust plate and operable upon slight rotative movement of said shoe for increasing the axial pressure of said shoe against said drum.

46. In combination, a conical drum, a conical shoe within said drum and having wedge-shaped thrust cams on its inner surface, a thrust plate axially movable with respect to said shoe and having means engaging said cams for expanding said shoe into engagement with said drum, said engaging means including means for preventing any substantial relative rotation of said plate with respect to said shoe.

47. In a brake of the class described, a rotatable brake drum, a brake shoe engageable therewith, thrust means operable to force said shoe into pressure engagement with said drum, means providing for rocking of said thrust means about two angularly related axes during operation thereof, the pressure engagement therebetween varying substantially directly in accordance with the operating force applied to said thrust means, means responsive to torque imposed upon said shoe upon engagement with said rotatable drum for converting a portion of said torque into an additional thrust imposed on said shoe forcing it into greater pressure engagement with said drum, said additional thrust adding a pressure increment to said pressure engagement produced by said thrust means, which increment varies directly in accordance with said torque; whereby the braking reaction between said drum and shoe with respect to the braking force applied by said thrust means constitutes a predetermined relationship which varies substantially in accordance with said torque, said torque responsive means producing no pressure increment with no torque regardless of the operating force applied to said thrust means.

48. In a brake mechanism, a stationary brake plate, a conical drum, a conical brake, means lying within the axial extent of said brake for applying an axial thrust to said brake to move said brake into engagement with said drum, and means carried by said plate radially outwardly of said thrust means and engaged by said brake upon rotative movement of said brake after engagement with said drum for moving said brake axially against said drum.

49. In a brake of the enclosed type, an end closure member therefor, hydraulic actuating means for said brake comprising a cylinder secured to the external face of said closure member and a hydraulically actuated piston movable axially in said cylinder, and means engaging the outer end of said piston and carried by and projecting from the outer end of said cylinder manually operable externally of said cylinder for moving said piston axially therein.

50. In a device of the class described, a conical drum, an internal conical brake therefor, an end closure member for said drum and brake, and interengaging means carried on the inner face of said member and on the inner periphery of the large end of said brake energized upon slight rotative movement of said brake in either direction for applying it to said drum.

51. In a brake mechanism, a conical brake drum, a conical shoe movable into and out of engagement with said drum, an end closure for said drum and shoe, a thrust plate engaging the inner periphery of said shoe intermediate its ends, thrust means pivoted on the inner face of said closure and engaging said plate at diametrically opposed points for axially moving said plate to engage said shoe with said drum, and servo mechanism disposed in a radial plane between said closure and said plate for pressing said shoe into further engagement with said drum upon tendency of said shoe to rotate with said drum.

THOMAS L. FAWICK.